(12) United States Patent
Okamoto (10) Patent No.: US 6,927,523 B2
(45) Date of Patent: Aug. 9, 2005

(54) BRUSH DEVICE AND MOTOR WITH BRUSH

(75) Inventor: Atsushi Okamoto, Adachi-ku (JP)

(73) Assignee: Namiki Seimitsu Houseki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/470,705

(22) PCT Filed: Nov. 29, 2002

(86) PCT No.: PCT/JP02/12571

§ 371 (c)(1),
(2), (4) Date: Aug. 4, 2004

(87) PCT Pub. No.: WO03/047073

PCT Pub. Date: Jun. 5, 2003

(65) Prior Publication Data

US 2004/0256945 A1 Dec. 23, 2004

(30) Foreign Application Priority Data

Nov. 30, 2001 (JP) ......................................... 2001-367265

(51) Int. Cl.[7] .......................... H01R 39/00; H01R 39/38; H02K 13/00
(52) U.S. Cl. .......................... 310/242; 310/239; 310/248
(58) Field of Search ................................ 310/239, 242, 310/245, 247, 248

(56) References Cited

U.S. PATENT DOCUMENTS

| | | | | |
|---|---|---|---|---|
| 5,661,357 A | * | 8/1997 | Iijima | 310/239 |
| 5,717,271 A | * | 2/1998 | Aoki et al. | 310/242 |
| 5,952,763 A | * | 9/1999 | Bruhn | 310/238 |
| 6,087,754 A | * | 7/2000 | Berger | 310/240 |

FOREIGN PATENT DOCUMENTS

| | | |
|---|---|---|
| JP | 44-12964 | 5/1969 |
| JP | 48-60398 | 8/1973 |
| JP | 58-22862 | 2/1983 |
| JP | 7-213023 | 8/1995 |

* cited by examiner

Primary Examiner—Tran Nguyen
(74) Attorney, Agent, or Firm—Nixon Peabody LLP (57) ABSTRACT

The present invention aims at making a motor with a brush in the direction of its motor shaft small by providing a thin brush device and at preventing deterioration of functions thereof. A guide portion is provided at a brush base portion and a recess portion is provided at the a brush holder. In the recess, an end portion of a winding portion of a coil-shape spring is held at the brush base portion, and the other end portion is held at the brush holder. Further, the longitudinal direction of the coil-shape spring is set so as to conform to the direction of face of the brush holder, and thereby the coil-shape spring and the brush are disposed on a substantially identical plane, having a state where the winding portion is placed along the guide and recess portion.

4 Claims, 11 Drawing Sheets

PRIOR ART

FIGURE 12

PRIOR ART

FIGURE 13

PRIOR ART

FIGURE 14

PRIOR ART

BRUSH DEVICE AND MOTOR WITH BRUSH

TECHNICAL FIELD

The present invention relates to a brush structure for a motor with a brush made of carbon, particularly to a brush device in which the above brush is pressed against a commutator by a coil-shape spring and a motor equipped with the same.

BACKGROUND ART

Figure 10:
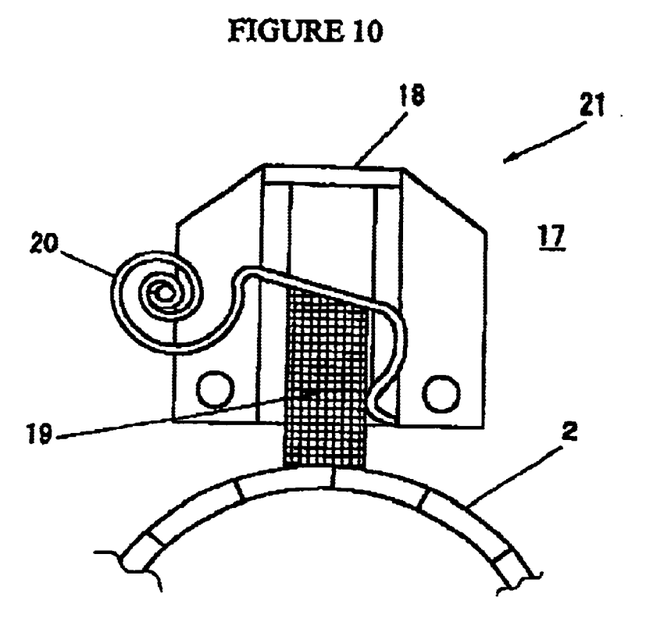
FIG. 10 is a plan view for showing conventional brush structure.
Figure 11:
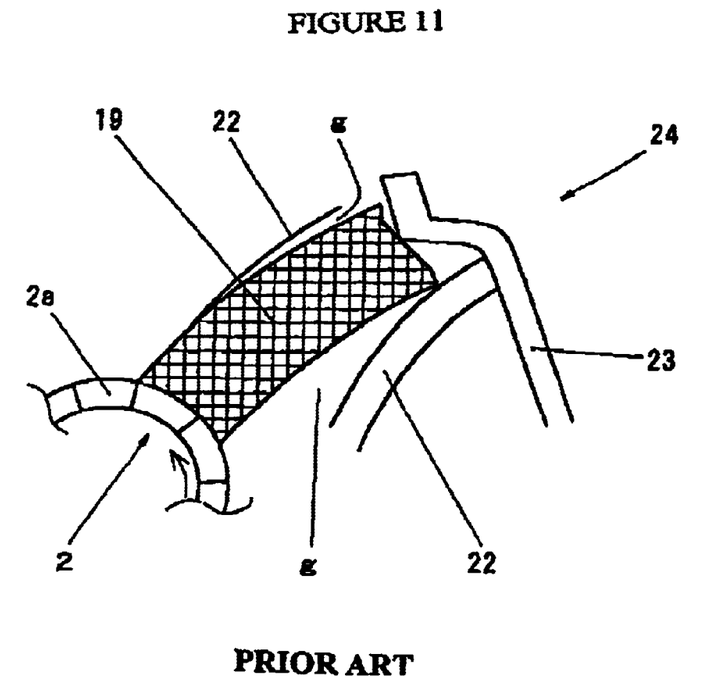
FIG. 11 is a plan view for showing another conventional brush structure.

Conventional brush structure equipped with spring means for pressing a brush against a commutator is shown in FIGS. 10 and 11. FIG. 10 shows a brush device 21 in which a brush 19 is stored in a holder body 18 fixed to a brush holder 17 and the brush 19 is pressed against an outer-peripheral surface of a commutator 2 by a coil-shape spring 20.

However, in this structure, because most part of side-face portion of the brush 19 is pressed against an inner wall of the holder body 18, a friction force becomes large and smooth sliding of the brush 19 in the longitudinal direction is prevented. As a result, this deteriorates followable function of the brush 19 against the commutator 2, and electric conduction between the commutator 2 and the brush 19 becomes unstable.

A brush device 24 for resolving the above-described problem, shown in FIG. 11, is disclosed in Japanese Patent Laid-Open Publication No. 7-213023. In this device, the brush 19 is formed in substantially arc shape and supported by making part of an outer-peripheral surface of the brush 19 contact an inner wall of a sustaining portion 22.

An outer-peripheral surface of an end portion of the brush 19 at the side of the commutator 2 is made contact the inner wall of the sustaining portion 22 by its friction force with the commutator 2, and an inner-peripheral surface of an end portion of the brush 19 at the side of a torsion spring 23 is made contact the inner wall of the sustaining portion 22 by a pressing force of the torsion spring 23. Accordingly, the brush 19 is supported with a clearance g from the inner wall of the sustaining portion 22, thereby improving followable function of the brush 19 against the commutator 2. Further, forming the brush 19 in arc shape can acquire a wear tolerance of the brush for sliding and also make a size of whole brush device in the radial direction small.

However, the brush device 24 shown in FIG. 11 still has a problem about its secure acquirement of the electric-conduction between the commutator and the brush. In the device shown in FIG. 11, the brush 19 is just supported with the clearance g from the inner wall of the sustaining portion 22, and the commutator 2 of an actual product is constituted of a plurality of commutator pieces 2a. Accordingly, when the brush 19 goes over each of the commutator pieces 2a, supporting of the brush 19 becomes unstable and vibration occurs easily.

Further, in some usages of a motor with a brush, the motor is driven reversely such that the commutator rotates in both clockwise direction and counterclockwise direction. In the brush device shown in FIG. 11, however, the reverse rotation of the commutator 2 in the clockwise direction causes fluttering of the brush 19 due to existence of the clearance g at two portions and supporting of the brush 19 becomes unstable. Accordingly, vibration tends to occur easily.

Figure 12:
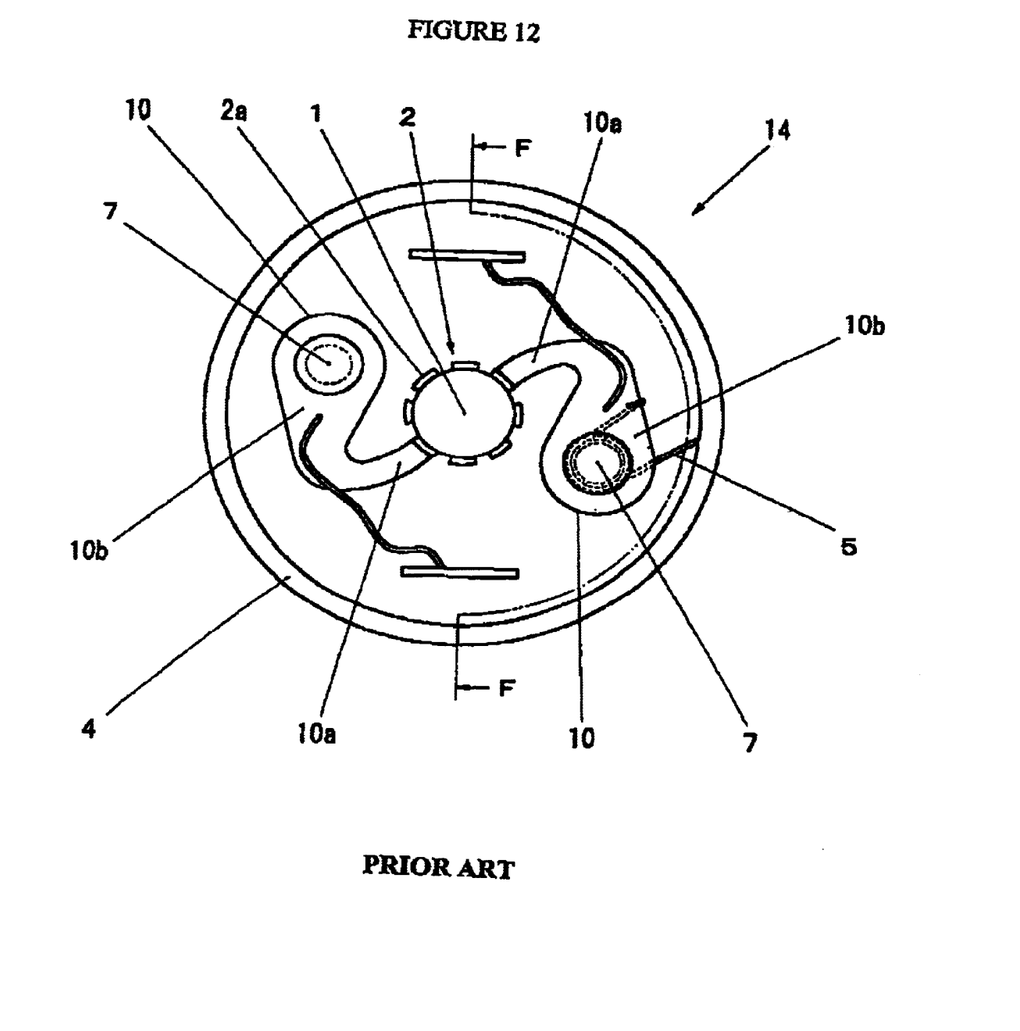
FIG. 12 is a plan view for showing further another conventional brush structure.
Figure 13:
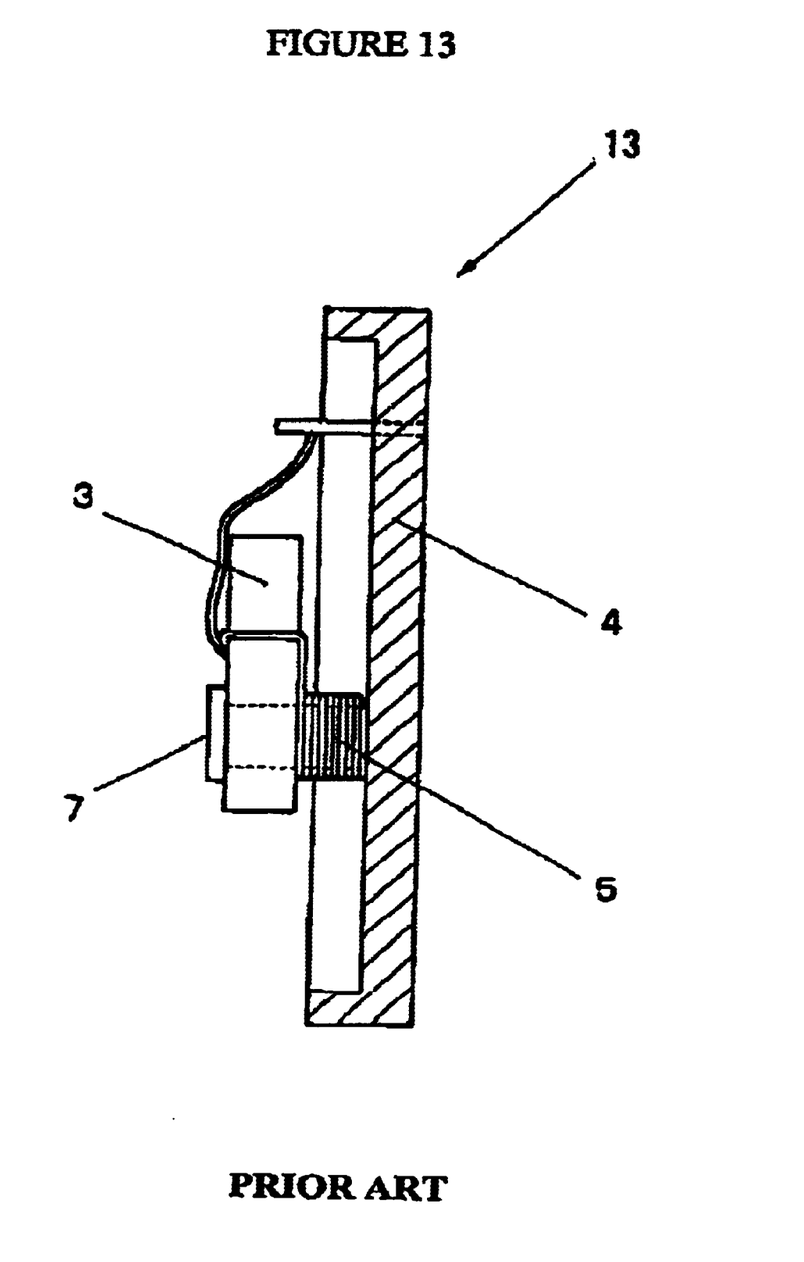
FIG. 13 is a schematic partial sectional view taken on a dot chain line F—F of FIG. 12.
Figure 14:
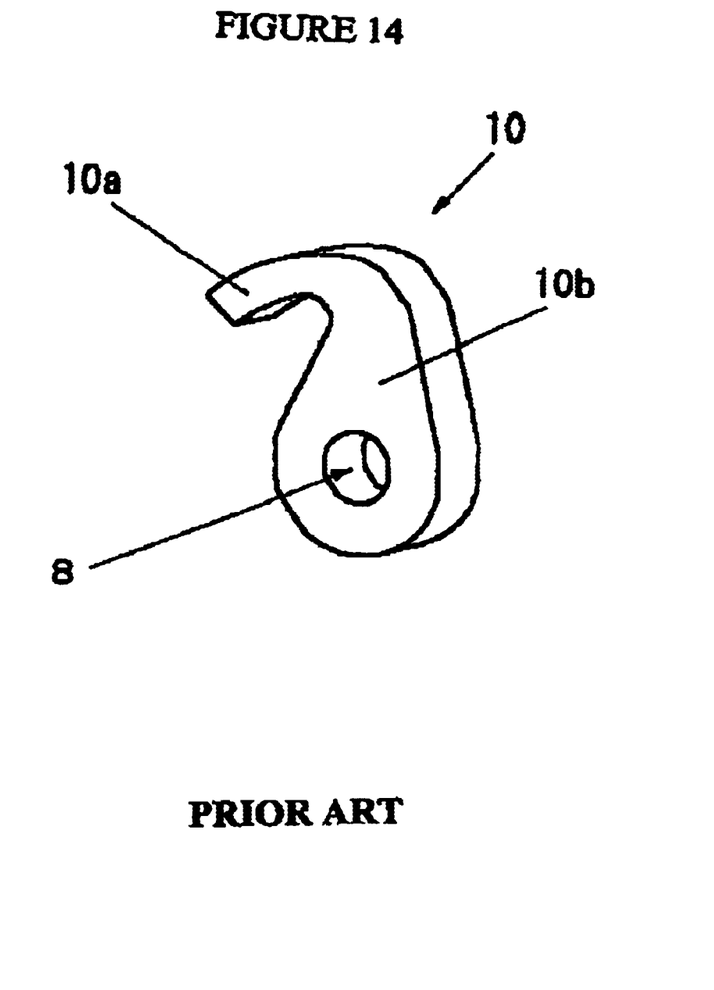
FIG. 14 is a perspective view of a brush used for the brush device of FIG. 12.

A brush devise 14 shown in FIGS. 12 and 13 has been materialized as a brush device to resolve the above-described problems. This brush device 14 is constituted such that a plurality of commutator pieces 2a are disposed on an outer-peripheral surface of a motor shaft 1 at regular intervals to form the commutator 2, and a brush 10 made of carbon is inserted in and supported by a supporting shaft 7 at a brush holder 4 that is a stator. The brush 10, as shown in FIG. 12, is constituted of a brush arm portion 10a, which includes a sliding face to provide an electric conduction with contacting the commutator pieces 2a and is formed in arc shape, and a brush base portion 10b, which includes a hole 8 for attaching the brush 10 to the brush holder 4 by inserting the supporting shaft 7 therein. The brush 10 is formed in substantially dogleg shape by integrating the brush arm portion 10a to the brush base portion 10b. Further, pressing means such as a coil-shape spring 5 and the like is provided so as to be coaxial to the supporting shaft 7, so that the sliding surface of the brush 10 contacts and slides on the commutator pieces 2a with pressing thereby.

The brush device 14 can prevent a contacting force of the brush 10 against the commutator 2 from changing due to wearing of the brush 10, by providing pressing means such as the coil-shape spring 5 (only one brush 10 is illustrated), thereby providing excellent stability of the electric conduction between the commutator 2 and the brush 10. Further, it has an advantage that because the brush arm portion 10a, which corresponds to the brush 19 of FIGS. 10 and 11, is supported by a relatively large-sized brush base portion 10b and the brush base portion 10b is inserted to the supporting shaft 7, supporting of the brush becomes stable and any vibration during the motor operation does not occur easily, compared with the brush device of FIGS. 10 and 11.

However, because the conventional device 14 has a structure in which the brush 10 is placed on the coil-shape spring 5 which is pressing means, the thickness of the brush device 14 increases in a direction of the motor shaft 1 accordingly. As a result, there is a problem that the size of the motor with a brush in the direction of motor shaft can not be made small.

The present invention has been devised in view of the above problems, and its object is to provide a brush device in which secure electric conduction between its brush and commutator can be obtained by improving contacting function therebetween, and the thickness thereof in the direction of motor shaft can be made small, compared with the conventional devices.

Further, it is to aim at making the size of a motor with a brush in the direction of a motor shaft small by using the above brush device.

DISCLOSURE OF THE INVENTION

The present invention relates to a brush device including a brush, a brush holder and a spring, the brush being constituted of a brush arm portion and a brush base portion, the brush arm portion being made of carbon, formed in substantially arc shape and including a sliding face that provides electric conduction with contacting a commutator, the brush base portion being attached so as to rotate around a supporting shaft, the brush being installed on the brush holder in such a manner that the sliding face thereof contacts the commutator with its rotation around the supporting shaft, the spring pressing the brush against the commutator, wherein a guide portion is formed at part of the brush base portion and a recess portion is formed at the brush holder, in the recess portion, one end portion of a winding portion of the coil-shape spring is held at the brush base portion and the other end portion thereof is held at the brush holder, the coil-shape spring is disposed such that its longitudinal direction conforms to a direction of the face of the brush holder, and the coil-shape spring and the brush are disposed on a substantially identical face having a state where the winding portion of the spring is placed along a shape of at least part of the guide portion and the recess portion.

According to the above-described brush device, because the brush is always pressed toward the side of the commutator, secure electric conduction between the brush and the commutator can be obtained. Further, it becomes possible to constitute a brush device with a small thickness, compared with the conventional device, by setting the coil-shape spring such that its longitudinal direction is disposed on the substantially identical face to the direction of the face of the brush holder.

Further, the present invention relates to a brush device including a brush, a brush holder and a spring, the brush being constituted of a brush arm portion and a brush base portion, the brush arm portion being made of carbon, formed in substantially arc shape and including a sliding face that provides electric conduction with contacting a commutator, the brush base portion being attached so as to rotate around a supporting shaft, the brush being installed on the brush holder in such a manner that the sliding face thereof contacts the commutator with its rotation around the supporting shaft, the spring pressing the brush against the commutator, wherein a recess portion is formed at the brush holder, an inserting cylinder for inserting the supporting shaft into the brush base portion that is constituted of a flat-plate-shape member and a guide portion for storing the coil-shape spring are formed so as to be integrated to each other, in the recess portion, the brush is installed on the brush holder by inserting the supporting shaft into the inserting cylinder, one end portion of a winding portion of the coil-shape spring is held at the brush arm portion and the other end portion thereof is held at the brush holder, the coil-shape spring is disposed such that its longitudinal direction conforms to a direction of the face of the brush holder, and the coil-shape spring and the brush are disposed on a substantially identical face having a state where the winding portion of the spring is placed along a shape of at least part of the guide portion and the recess portion.

Further, the present invention relates a brush device including a brush, a brush holder and a spring, the brush being constituted of a brush arm portion and a brush base portion, the brush arm portion being made of carbon, formed in substantially arc shape and including a sliding face that provides electric conduction with contacting a commutator, the brush base portion being attached so as to rotate around a supporting shaft, the brush being installed on the brush holder in such a manner that the sliding face thereof contacts the commutator with its rotation around the supporting shaft, the spring pressing the brush against the commutator, wherein the spring is constituted of a torsion spring, a recess portion is formed at the brush holder, an inserting cylinder for inserting the supporting shaft into the brush base portion that is constituted of a flat-plate-shape member is formed so as to be integrated to the brush base portion, in the recess portion, the brush is installed on the brush holder by inserting the supporting shaft into the inserting cylinder, the torsion spring is placed around an outer-peripheral surface of the inserting cylinder such that the longitudinal direction of the torsion spring is disposed perpendicularly to a direction of the face of the brush holder, an end portion of the spring-wire member extending from one end portion of a winding portion of the torsion spring is held at the brush holder and an end portion of the spring-wire member extending from the other end portion thereof is held at the brush.

According to the above-described brush device, because the brush is always pressed toward the side of the commutator, secure electric conduction between the brush and the commutator can be obtained. Further, because the brush base portion of the brush is constituted of the flat-plate-member with suppressing increasing the thickness and the torsion spring is placed thereon, it becomes possible to constitute a brush device with a small thickness, compared with the conventional devices.

Further, the present invention provides a brush device in which the brush arm portion and the brush base portion are formed separately, and another-end side of the sliding surface is connected by a damper disposed at the brush base portion. According to the brush device constituted above, because only the brush arm portion is replaceable, the whole brush needs not to be replaced when the sliding face is worn away, thereby improving the function of maintenance of the brush device.

Further, the present invention provides a motor with a brush equipped with the above-described brush device.

The motor with a brush that is constituted as above can make the length of the motor in the direction of the motor shaft small, compared with the conventional motor with a brush.

BEST MODE FOR CARRYING OUT THE INVENTION

<First Embodiment>

Figure 1:
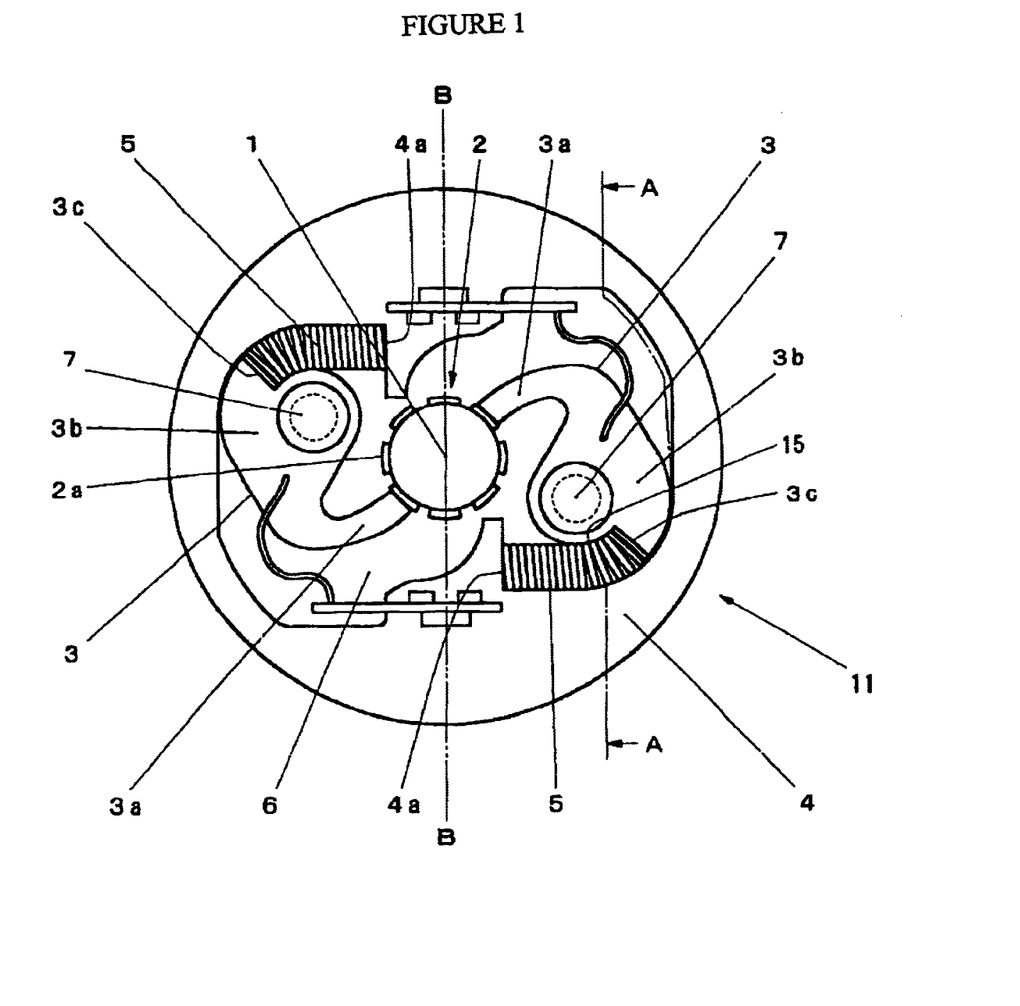
FIG. 1 is a plan view of a brush device of the first embodiment according to the present invention.
Figure 2:
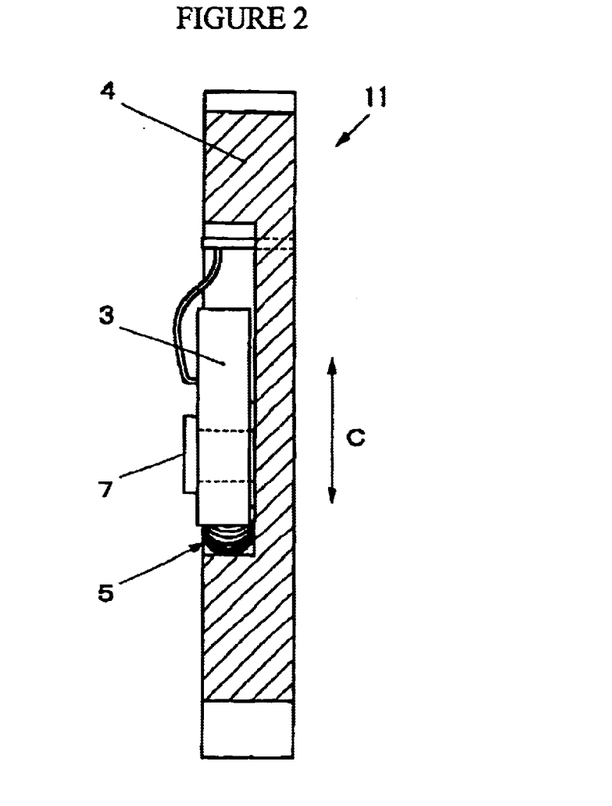
FIG. 2 is a partial-side sectional view partially taken of FIG. 1.
Figure 3:
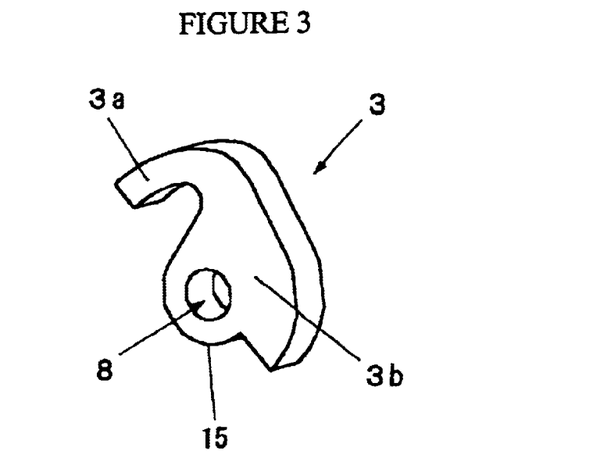
FIG. 3 is a perspective view of a brush that is used for the brush device of FIG. 1.
Figure 4:
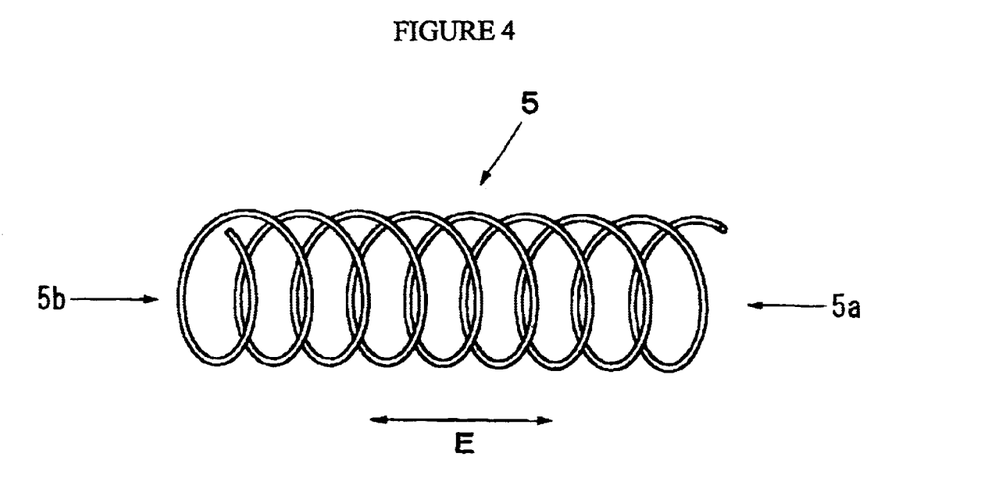
FIG. 4 is a perspective view of a coil-shape spring.

Hereinafter, the first embodiment of a brush device according to the present invention will be described with reference to the FIGS. 1 to 4. FIG. 1 is a plan view of a brush device 11 according to the first embodiment, FIG. 2 is a partial-side sectional view of a brush holder 4 of the brush device 11 taken on a dot chain line A—A of FIG. 1, FIG. 3 is a perspective view of a brush 3 of the brush device 11 of FIG. 1, and FIG. 4 is a perspective view of a coil-shape spring 5 used for the brush device 11.

A recess portion 6 for storing the brush 3 and the coil-shape spring 5 is formed on the plane of the brush holder 4 so as to be symmetrical with a 180 degree difference about an axis B—B passing through the center of the brush holder 4. A supporting shaft 7 is formed so as to rise from the bottom face of the recess 6 and is integrated to the brush holder 4. Meanwhile, a brush base portion 3b of the brush 3 is provided with a hole 8 for inserting the supporting shaft 7 therein as shown in FIG. 3, and part of its external figure is formed in arc shape so as to provide a guide portion 15 to hold at least part of a winding portion of the coil-shape spring 5. A reference numeral 1 denotes a motor shaft that is attached to a motor body with a brush, which is not shown in any drawing, so as to rotate freely, and a commutator 2 is constituted by providing a plurality of commutator pieces 2a on an outer-peripheral surface of the motor shaft 1 at regular intervals. As shown in FIGS. 1 and 3, the brush 3 is formed in substantially doglegged shape, integrating a brush arm portion 3a with its sliding face contacting the commutator 2 to the above brush base portion 3b continuously. Although at least the brush arm portion 3a of the brush 3 should be made of carbon, an example in which the whole brush 3 is made of carbon will be described in the present embodiment. Herein, the brush arm portion 3a is formed substantially in gentle arc-shape.

The brush 3 is installed in the above recess portion 6 so as to rotate around the supporting shaft 7 freely, by inserting the supporting shaft 7 into the above-described hole 8. Further, one end portion 5a of the winding portion of the coil-shape spring 5 is held at a holding face 3c formed at the brush 3, and the other end portion 5b is held at a step portion 4a formed to constitute the recess portion 6. Next, while setting the longitudinal direction (arrow E direction of FIG. 4) of the coil-shape spring 5 to the face direction (arrow C direction of FIG. 4) of the brush holder 4, the coil-shape spring 5 is installed in the recess portion 6 by providing part of the winding portion along inner-peripheral shape of at least part of the guide portion 15 and the recess portion 6.

Expanding of the coil-shape springs 5 along the inner-peripheral surfaces of the guide portions 15 and the recess portions 6 makes the two brushes 3 rotate around the respective supporting shafts 7 toward the commutator 2, so that the sliding faces at the ends of the brush arm portions 3a are pressed to contact the commutator pieces 2a.

Starting the motor with a brush equipped with the above-described brush device makes the motor shaft 1, which is a rotor, rotate, so that the commutator 2 and the brush 3 slide on each other to provide electric conduction between them, thereby driving the motor. Long-term driving of the motor would make the sliding face of the brush 3 being worn away due to its friction with the commutator 2 and thereby the brush arm portion 3a would shorten gradually. However, because the coil-shape spring 5 presses always the brush 3 toward the commutator 2 as described above, the brush 3 and the commutator 2 always contact each other and thereby the electricity flows securely from the brush 3 to the commutator 2, regardless of long-term driving of the motor.

Further, as shown in FIG. 2, by setting the longitudinal direction of the coil-shape spring 5 so as to be disposed on substantially identical face to the direction of the face of the brush holder 4 such that the winding portion of the coil-shape spring 5 does not project from the thickness of the brush 3, the brush device can be made thin, compared with the conventional devices.

<Second Embodiment>

Figure 5:
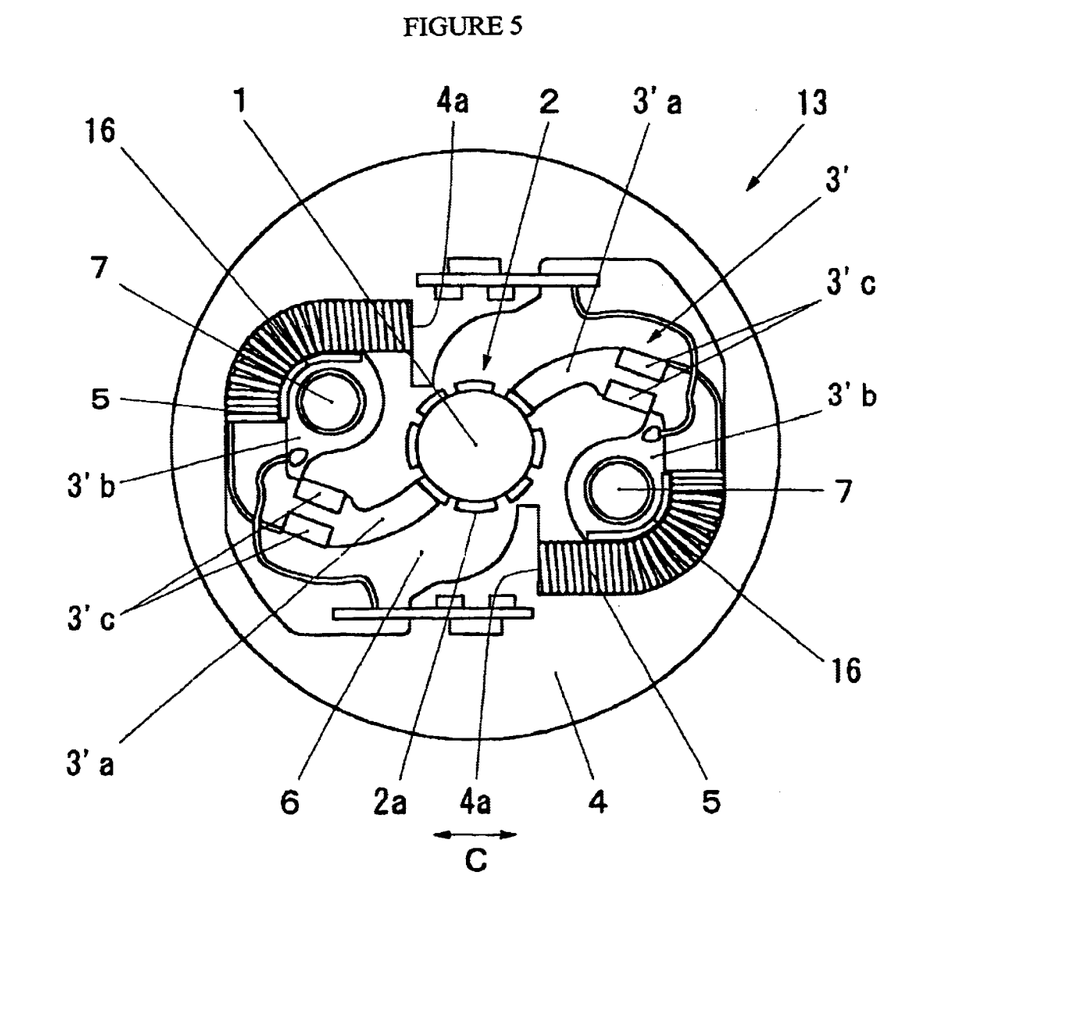
FIG. 5 is a plan view for showing a brush device of the second embodiment according to the present invention.
Figure 6:
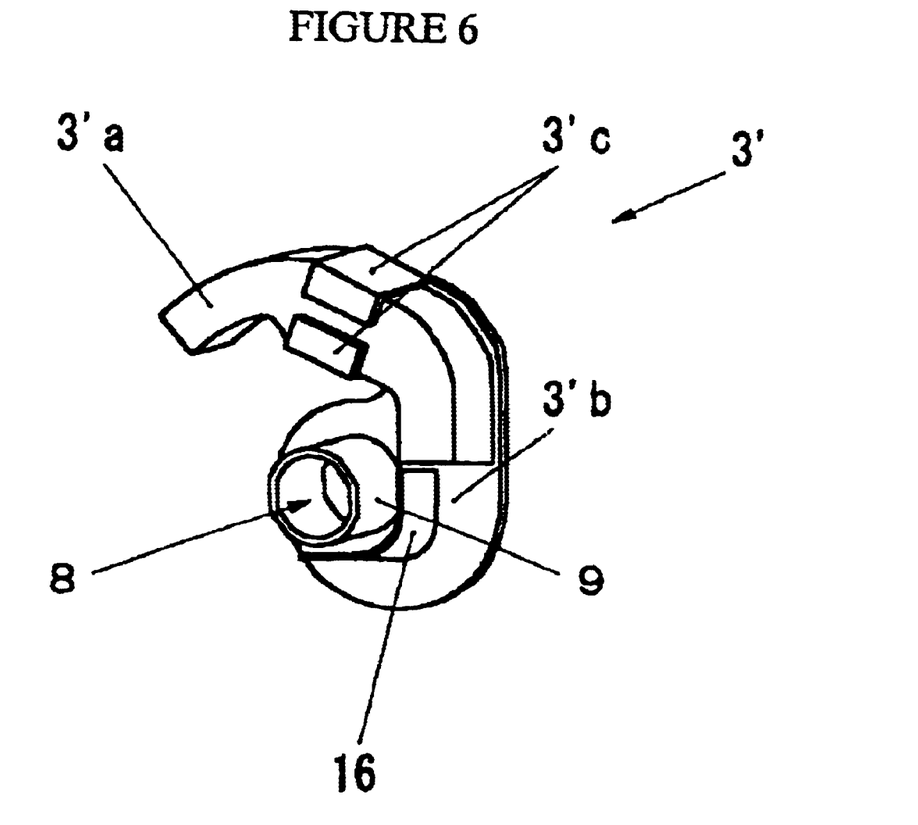
FIG. 6 is a perspective view of a brush that is used for the brush device of FIG. 5.

Next, the second embodiment of the brush device according to the present invention will be described with reference to FIGS. 5 and 6. FIG. 5 is a plan view of a brush device 13 according to the second embodiment, and FIG. 6 is a perspective view of a brush 3' in the brush device 13 of FIG. 5. Herein, only different components from the first embodiment will be described for the second embodiment, and the same components as the first embodiment are denoted by the same reference numerals and their duplicate descriptions will be omitted or described briefly.

As shown in FIG. 6, a brush base portion 3'b of the brush 3' is constituted of a flat-plate-shape member which is made of metal, and the hole 8 for inserting the supporting shaft 7 is formed at a certain position, and an inserting cylinder 9 for inserting the supporting shaft 7 therein is provided so as to extend from the hole 8 and be integrated thereto. Further, a brush arm portion 3'b including a sliding face that contacts the commutator 2 is provided separately, and the brush 3' having substantially doglegged shape as a whole is formed by connecting the sliding face to an end portion of the brush arm portion 3'a which is at the side of the other end by a clamper 3'c provided at the brush base portion 3'b. In the present embodiment, the brush arm portion 3'a is made of carbon and formed substantially in gentle arc-shape. Further, the hole 8 formed at the brush base portion 3'b, the inserting cylinder 9 and the clamper 3'c are formed so as to be integrated to each other by pressing a metal sheet.

By inserting the supporting shaft 7 into the hole 8 and the inserting cylinder 9, the brush 3' is installed in the recess 6 so as to rotate freely around the supporting shaft 7. Further, one end portion 5a (see FIG. 4) of the winding portion of the coil-shape spring 5 is held at a clamper-connection-side end face of the brush arm portion 3'a, and the other end portion 5b (see FIG. 4) is held at a step portion 4a formed to constitute the recess portion 6. Next, while setting the longitudinal direction (arrow E direction of FIG. 4) of the coil-shape spring 5 to the face direction (arrow C direction of FIG. 5) of the brush holder 4, the coil-shape spring 5 is installed in the recess portion 6 by providing part of the winding portion of the coil-shape spring 5 along inner-peripheral shape of at least part of a guide portion 16 and the recess portion 6.

Expanding of the coil-shape springs 5 along the inner-peripheral surfaces of the guide portions 16 and the recess portions 6 makes the two brushes 3' rotate around the respective supporting shafts 7 toward the commutator 2, so that the sliding faces at the ends of the brush arm portions 3'a are pressed to contact the commutator 2a.

Accordingly, like the first embodiment, the electricity flows securely from the brush 3' to the commutator 2, regardless of the long-term driving of the motor equipped with the brush device of the present embodiment.

Further, in the present embodiment, the brush base portion 3'b is made of a flat-plate-shape member to suppress its thickness, and the longitudinal direction of the coil-shape spring 5 is set so as to be disposed on substantially identical face to the direction of the face of the brush holder 4 such that the winding portion of the coil-shape spring 5 does not project from the thickness of the brush 3' by utilizing the suppressed thickness. Accordingly, the brush device can be made thin, compared with the conventional devices.

Further, only worn brush arm portion 3'a can be replaceable by constituting the brush arm portion 3'a of a separate member in the present embodiment, and thereby there is no need to replace the whole brush 3' and the function of maintenance of the brush device improves accordingly.

<Third Embodiment>

Figure 7:
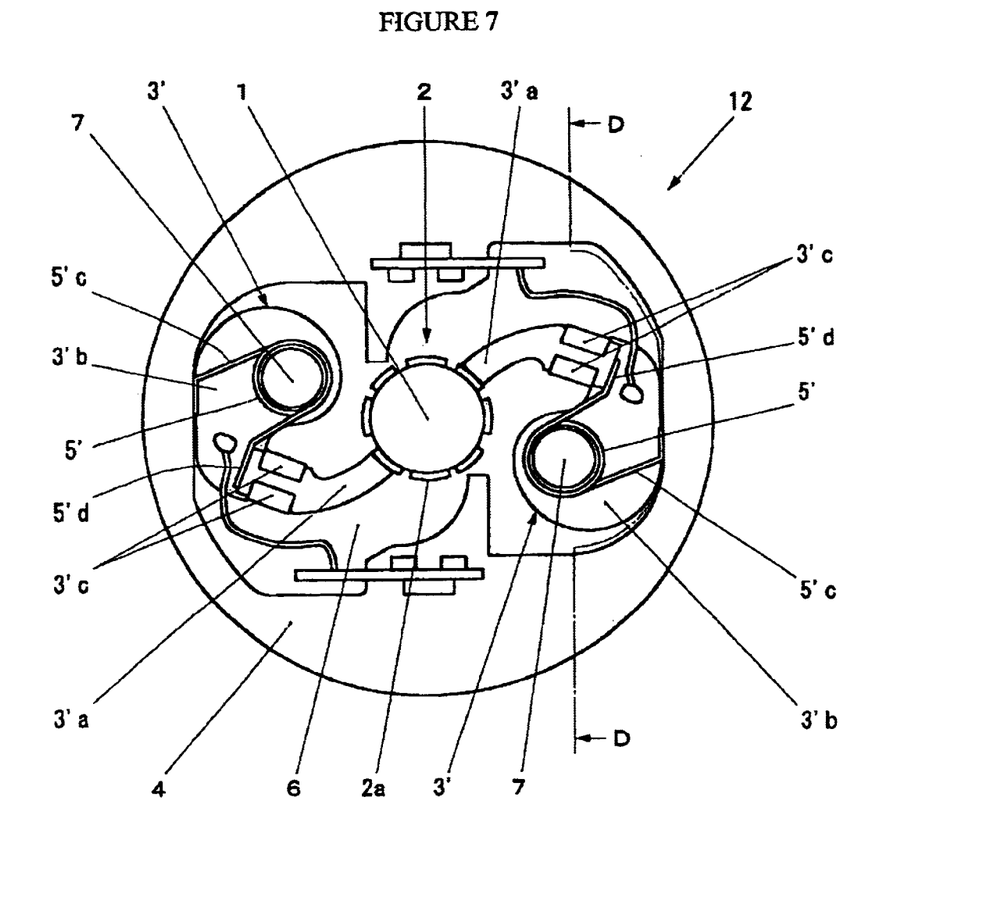
FIG. 7 is a plan view for showing a brush device of the third embodiment according to the present invention.
Figure 8:
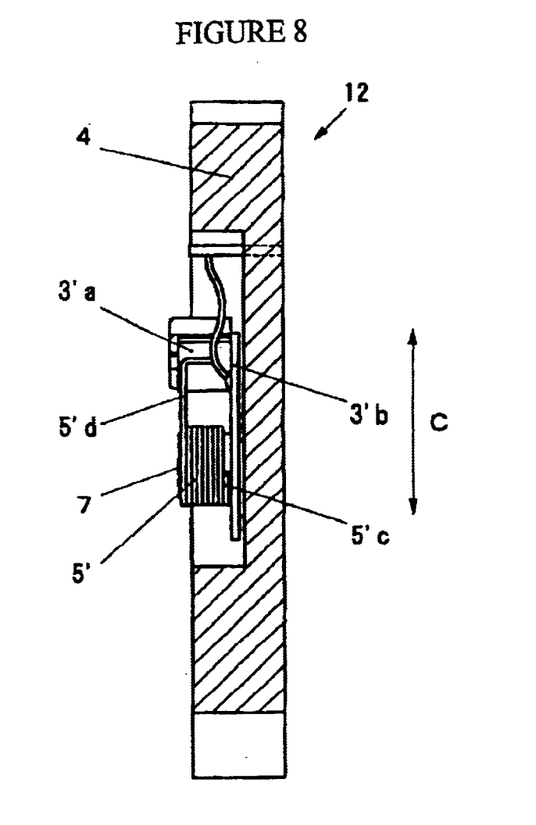
FIG. 8 is a partial-side sectional view partially taken of FIG. 7.

Next, the third embodiment of the brush device according to the present invention will be described with reference to FIGS. 7 and 8. FIG. 7 is a plan view of a brush device 12 according to the third embodiment, and FIG. 8 is a partial-side sectional view of a brush holder 4 of the brush device 12 taken on a dot chain line D—D of FIG. 7. Herein, only different components from the first or second embodiment will be described for the third embodiment, and the same components as these embodiments are denoted by the same reference numerals and their duplicate descriptions will be omitted or described briefly.

A shown in FIG. 7, a brush base portion 3'b of the brush 3' is constituted of a flat-plate-shape member which is made of metal, and a hole for inserting the supporting shaft 7 is formed at a certain position of the brush base portion 3', and an inserting cylinder for inserting the supporting shaft 7 therein is provided so as to extend from the hole and be integrated thereto. Further, a brush arm portion 3'a is provided separately, and the brush 3' having substantially doglegged shape as a whole is formed by connecting them by a clamper 3'c. Further, in the present embodiment, the brush arm portion 3'a is made of carbon and formed substantially in gentle arc-shape.

By inserting the supporting shaft 7 into the above hole and the inserting cylinder, the brush 3' is installed in the recess 6 so as to rotate freely around the supporting shaft 7.

Further, a torsion spring 5' is placed around the outer-peripheral surface of the inserting cylinder, and an end portion 5'c of a wire member extending from one end of the winding portion of the torsion spring 5' is held at the brush holder 4, and an end portion 5'd of the wire member extending from the end thereof is held at a clamper-connection-side end face of the brush arm portion 3'a constituting the brush 3'.

Two brush 3' rotes around the respective supporting shafts 7 toward the commutator 2 due to a spring force of the torsion spring 5', and the sliding faces at the ends of the brush arm portion 3'b are pressed to contact the commutator pieces 2a.

Accordingly, like the first and second embodiments, the electricity flows securely from the brush 3' to the commutator 2, regardless of the long-term driving of the motor equipped with the brush device of the present embodiment.

Further, in the present embodiment, as shown in FIG. 8, the brush base portion 3'b of the brush 3' is made of a flat-plate-shape member to suppress its thickness. Accordingly, even if the torsion spring 5' is installed such that the longitudinal direction of the torsion spring 5' is perpendicular to the surface direction (arrow C) of the brush holder 4, the winding portion of the torsion spring 5' does not project over the thickness of the brush arm portion 3'a. Accordingly, the brush device can be made thin, compared with the conventional brush device.

Further, only worn brush arm portion 3'a can be replaceable by constituting the brush arm portion 3'a of a separate member in the present embodiment, and thereby there is no need to replace the whole brush 3' and the function of maintenance of the brush device improves accordingly.

Figure 9:
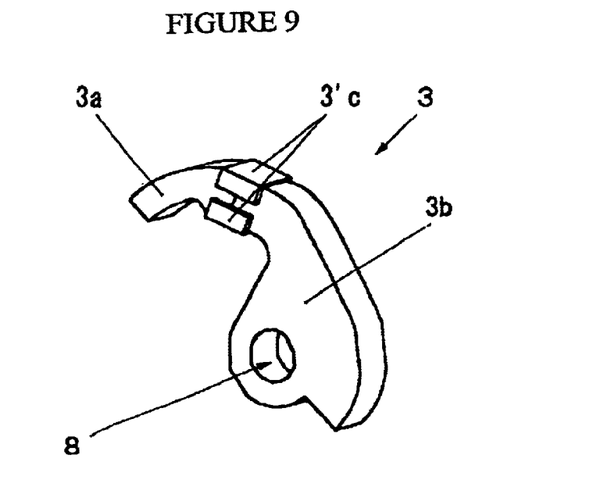
FIG. 9 is a perspective view for showing another form of a brush that is used for the brush device according to the present invention.

Although three exemplary embodiments of the present invention have been described, the present invention should not be limited by these. For example, as shown in FIG. 9, it may be constituted such that the brush arm portion 3a and the brush base portion 3b of the brush 3 in the first embodiment are made of separate members, and only the brush arm portion 3a is made of carbon.

INDUSTRIAL APPLICABILITY

As described above, according to the present invention, the longitudinal direction of the coil-shape spring is set so as to be on substantially identical face to the direction of the face of the brush holder, and accordingly the brush device can be made thin, compared with the conventional devices. Further, applying the brush device to a motor can shorten the length thereof in the direction of motor shaft, without deteriorating functions of the motor with a brush.

Further, the brush base portion of the brush is made of a flat-plate-shape member to suppress its thickness. Accordingly, even if the torsion spring is installed such that the longitudinal direction of the torsion spring is perpendicular to the direction of face of the brush holder, the winding portion of the torsion spring does not project over the thickness of the brush arm portion. Accordingly, the brush device can be made thin, compared with the conventional brush devices. Further, applying the brush device to a motor can shorten the length thereof in the direction of motor shaft, without deteriorating functions of the motor with a brush.

In addition to the above, only worn brush arm portion can be replaceable by constituting the brush arm portion and brush base portion of the brush of separate members, and thereby there is no need to replace the whole brush. As a result, the brush device with an excellent function of maintenance can be obtained accordingly.

What is claimed is:

1. A brush device including a brush, a brush holder and a spring, the brush being constituted of a brush arm portion and a brush base portion, the brush arm portion being made of carbon, formed in substantially arc shape and including a sliding face that provides electric conduction with contacting a commutator, the brush base portion being attached so as to rotate around a supporting shaft, the brush being installed on the brush holder in such a manner that the sliding face thereof contacts the commutator with its rotation around the supporting shaft, the spring pressing the brush against the commutator, wherein a guide portion is formed at part of said brush base portion and a recess portion is formed at said brush holder, in said recess portion, one end portion of a winding portion of said coil-shape spring is held at said brush base portion and the other end portion thereof is held at said brush holder, said coil-shape spring is disposed such that its longitudinal direction conforms to a direction of the face of the brush holder, and said coil-shape spring and said brush are disposed on a substantially identical face having a state where said winding portion of the spring is placed along a shape of at least part of said guide portion and said recess portion.

2. A brush device including a brush, a brush holder and a spring, the brush being constituted of a brush arm portion and a brush base portion, the brush arm portion being made of carbon, formed in substantially arc shape and including a sliding face that provides electric conduction with contacting a commutator, the brush base portion being attached so as to rotate around a supporting shaft, the brush being installed on the brush holder in such a manner that the sliding face thereof contacts the commutator with its rotation around the supporting shaft, the spring pressing the brush against the commutator, wherein a recess portion is formed at said brush holder, an inserting cylinder for inserting said supporting shaft into the brush base portion that is constituted of a flat-plate-shape member and a guide portion for storing said coil-shape spring are formed so as to be integrated to each other, in said recess portion, said brush is installed on said brush holder by inserting the supporting shaft into said inserting cylinder, one end portion of a winding portion of said coil-shape spring is held at said brush arm portion and the other end portion thereof is held at said brush holder, said coil-shape spring is disposed such that its longitudinal direction conforms to a direction of the face of the brush holder, and said coil-shape spring and said brush are disposed on a substantially identical face having a state where said winding portion of the spring is placed along a shape of at least part of said guide portion and said recess portion.

3. A brush device including a brush, a brush holder and a spring, the brush being constituted of a brush arm portion and a brush base portion, the brush arm portion being made of carbon, formed in substantially arc shape and including a sliding face that provides electric conduction with contacting a commutator, the brush base portion being attached so as to rotate around a supporting shaft, the brush being installed on the brush holder in such a manner that the sliding face thereof contacts the commutator with its rotation around the supporting shaft, the spring pressing the brush against the commutator, wherein said spring is constituted of a torsion spring, a recess portion is formed at said brush holder, an inserting cylinder for inserting said supporting shaft into the brush base portion that is constituted of a flat-plate-shape member is formed so as to be integrated to said brush base portion, in said recess portion, said brush is installed on said brush holder by inserting the supporting shaft into said inserting cylinder, said torsion spring is placed around an outer-peripheral surface of the inserting cylinder such that the longitudinal direction of the torsion spring is disposed perpendicularly to a direction of the face of the brush holder, an end portion of said spring-wire member extending from one end portion of a winding portion of said torsion spring is held at said brush holder and an end portion of said spring-wire member extending from the other end portion thereof is held at said brush.

4. A motor with a brush equipped with a brush device of any one of claims 1 through 3.

* * * * *